(No Model.)
C. F. SCOTT.
STATION POTENTIAL INDICATOR.
No. 500,543. Patented June 27, 1893.
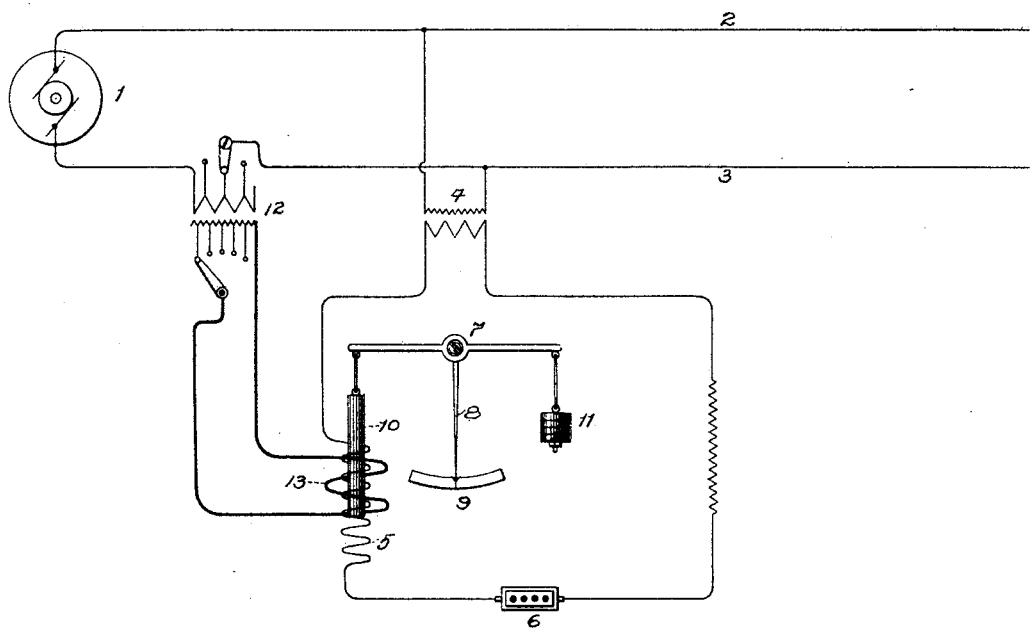
Witnesses
Ralph D. Mershon
H. C. Tener
Inventor
Chas. F. Scott.
By his Attorney
H. S. MacKaye

UNITED STATES PATENT OFFICE.

CHARLES F. SCOTT, OF PITTSBURG, PENNSYLVANIA, ASSIGNOR TO THE WESTINGHOUSE ELECTRIC AND MANUFACTURING COMPANY, OF SAME PLACE.

STATION POTENTIAL-INDICATOR.

SPECIFICATION forming part of Letters Patent No. 500,543, dated June 27, 1893.

Application filed September 28, 1892. Serial No. 447,141. (No model.)

*To all whom it may concern:*

Be it known that I, CHARLES F. SCOTT, a citizen of the United States, residing in Pittsburg, in the county of Allegheny and State of Pennsylvania, have invented a new and useful Improvement in Station Potential-Indicators, (Case No. 510,) of which the following is a specification.

This invention relates to devices whereby an instrument located at the generating station of an electric distribution plant is made to indicate the potential at a point at any desired distance from the station. Where long lines are used and the drop in potential is therefore considerable, it is desirable to provide means whereby the electromotive force of the generator may be intelligently regulated to maintain the potential at the farther end of the line constant in spite of the drop due to the line resistance. The resistance in a line varies not only with the number of translating devices cut in and out, but also with the distance of such translating devices from the generator.

My invention relates to devices for use with alternating current systems, and is shown in the accompanying drawing, which illustrates diagrammatically a device for indicating the potential at the farther end of the line of electrical distribution, and adapted to be used with lines carrying various currents with various percentages of loss.

As illustrated, the generator, which may be of any type is shown at 1, and the lines 2, 3, are the mains fed thereby. At the generating station or other convenient point the converter 4 is coupled in multiple arc with the translating devices. The secondary of this converter is in series with a solenoid 5, called herein the potential coil, and any suitable resistance 6, for the purposes of adjustment. A pivoted lever 7 is provided with a pointer 8 swinging in front of a scale 9. A laminated core 10 attached to said lever is adapted to move within the solenoid 5 and the attraction of said solenoid is counterbalanced by the weight 11. While I have shown a preferred form of indicator, any form of counterbalanced pointer may be used without departing from my invention.

In series with the main line is the primary of a converter 12 whose secondary includes an auxiliary coil 13, called herein the current coil, adapted to act upon the core 10, as shown, and so wound as to counteract the coil 5. This converter is provided with switches in the primary and secondary circuits, as illustrated, whereby more or less coils may be thrown into each circuit, and so an extended range of adjustment secured. The relation of secondary to primary currents in the two converters is dependent upon the special conditions of the plant, and although I have shown a step-up converter in series and a step-down converter in multiple, I wish it to be understood that these relations of decrease and increase are not essential to the operation of my device. It will now be evident that the effect of the coil 5 will vary with the potential at the generator terminals, while the effect of the coil 13 will be due simply to the current in the main line consumed by the translating devices. If, then, a translating device be put in circuit at the extreme end of the line, the potential available at such translating device will be less than desirable owing to the drop due to line resistance, and it is necessary that the generator be adjusted by means well known to supply a higher electromotive force, in order to compensate for this drop and maintain the pressure at the translating devices constant. Considering this contingency with relation to my station indicator, it will be seen that the extra current called for by the newly introduced translating device will strengthen the current coil 13, and so diminish the action of the potential coil on the core 10, thus indicating an apparent drop of potential at the terminals of the converter 4 by a swing of the pointer 8. By properly proportioning the action of the coil 13 to that of the coil 5, it is possible to virtually place the converter 4 at the end of the line and make the pointer 8 indicate zero on its scale only when the potential at such farther point is that desired. Thus by observing the position of the pointer and regulating the electromotive force at the generator to keep said pointer at zero, a constant potential can be maintained at the extreme end of the line.

When the conditions of service cause a change at any time in the drop to be compensated for, my device can be adjusted to such new condition by proper manipulation of the switches at the converter 12, whereby the effect of the coil 13 is modified.

What I claim is—

A station indicator for alternating current systems comprising a converter having its primary coil in series with the main line, a second converter having its primary coil in multiple arc across the line, a compound solenoid composed of coils in circuit with the secondary of the first-named converter, and an opposing coil in circuit with the secondary of said second converter, a switch whereby more or less of the primary coils of said first converter may be thrown into circuit, a switch whereby more or less of the secondary coils of said first converter may be thrown into circuit, and an indicating device adapted to be acted on by said solenoid, substantially as described.

In testimony whereof I have hereunto subscribed my name this 26th day of September, A. D. 1892.

CHAS. F. SCOTT.

Witnesses:
JAMES WM. SMITH,
HAROLD S. MACKAYE.